United States Patent [19]

Hodapp et al.

[11] 4,269,091

[45] May 26, 1981

[54] ARRANGEMENT FOR CUTTING GUIDED CYLINDRICAL SLEEVES

[75] Inventors: Otto Hodapp, Tuebingen; Ulrich Lindner, Rottenburg, both of Fed. Rep. of Germany

[73] Assignee: Christian Majer KG Maschinenfabrik, Tuebingen, Fed. Rep. of Germany

[21] Appl. No.: 72,655

[22] Filed: Sep. 5, 1979

Related U.S. Application Data

[63] Continuation-in-part of Ser. No. 911,304, Jun. 1, 1978.

[30] Foreign Application Priority Data

Jun. 2, 1977 [DE] Fed. Rep. of Germany ....... 2724936

[51] Int. Cl.[3] ......................... B23B 5/14; B23B 15/00

[52] U.S. Cl. .......................................... 82/48; 82/90; 82/101; 82/102

[58] Field of Search ................... 82/48, 52, 53, 54, 56, 82/89, 90, 91, 101, 102

[56] References Cited

U.S. PATENT DOCUMENTS

| | | | |
|---|---|---|---|
| 460,317 | 9/1891 | Whitney | 82/89 |
| 1,967,374 | 7/1934 | Scott | 82/89 |
| 3,628,406 | 12/1971 | Stevens | 82/89 |
| 3,933,090 | 1/1976 | Reynolds | 82/48 |

*Primary Examiner*—Leonidas Vlachos

[57] ABSTRACT

A machine for automatically cutting and dividing of cylindrical sleeves guided and supported on a drawoff spindle by means of a plurality of coaxially arranged rotary knives. The machine includes a transport arrangement for transporting an uncut sleeve onto the drawoff spindle where it is cut by the rotary knives and then transporting the now-divided sleeve onto an adjustable carrier sled which is transversely movably mounted relative to the axis of the drawoff spindle. The transport arrangement includes a pair of end pressure members which are movable toward and away from each other and which are adapted to grip the cut and uncut sleeve therebetween. The carrier sled includes a pair of adjustable parallel sleeve-receiving troughs which are adapted to be reciprocally mounted between precisely-defined relative positions with respect to the carrier sled and a rotary knife-supporting beam.

6 Claims, 9 Drawing Figures

ARRANGEMENT FOR CUTTING GUIDED CYLINDRICAL SLEEVES

This application is a continuation-in-part of my copending application Ser. No. 911,304 filed on June 1, 1978.

BACKGROUND OF THE INVENTION

The invention relates to a machine for automatically cutting cylindrical sleeves which have been guided onto a drawoff spindle. The cutting is effected by means of a plurality of coaxial, rotating circular knives. The cut sleeve portions are automatically delivered by means of a transport arrangement.

In order to cut prepared cylindrical sleeves or tubes, in particular those types of sleeves or tubes made of wound paper or cardboard, into a plurality of sleeve or tube sections, there result generally at both ends of the tube or sleeve waste sleeve sections, the length of which is smaller than the length of the cut sleeve sections of predetermined length. These waste pieces have to be disposed of because they would disturb the further processing of the cut sleeve sections. Heretofore it was customary with the aforedescribed arrangement to collect the correctly-sized sleeve sections together with the waste cut sleeve sections in a collection container into which they are dropped and then to sort cut the correctly-sized sleeve sections by hand. Such a procedure, however, is too expensive; furthermore, such a procedure does not fit into a fully-automated processing plane in which the cut sleeve sections are removed from the drawoff machine immediately into a further processing arrangement. An automatic separation of the waste cut sleeve sections from the correctly-sized sleeve sections in the drawoff machine presents, however, some serious difficulties because the waste cut sections generally, when comparing these two waste cut sections from each end, have different lengths.

SUMMARY OF THE INVENTION

It is a general object of this invention to provide a machine of the aforedescribed type which is adapted to carry out an automatic separation of the waste end sleeve sections so that only the correctly-sized sleeve sections are dropped into a container or are guided into a subsequent processing arrangement.

This object of the invention is attained by having a transport arrangement incorporated into the machine which has two end pressure members movable in opposite directions between which the sleeve section is held by applying pressure against both ends of the sleeve section in the axial direction, before and after the sleeve section is cut. In addition, a transport arrangement is provided movable between the drawoff spindle and a carrier sled which is adjustably movable transversely with respect to the axis of the drawoff spindle. The carrier sled is provided with two parallel sleeve-receiving troughs and the transport arrangement is reciprocally movable between precisely defined positions relative to the carrier sled and the circular knife support. At least one of the two sleeve-receiving troughs is constructed fixed lengthwise or adjustably so that it can be made to precisely correspond to the sum of the individual lengths of the plurality of sleeve sections into which the sleeve is to be cut. Furthermore, it is provided with bristles which are longitudinally arranged on opposite sides of the trough for purposes of contacting the sleeve.

The machine constructed in accordance with this invention has the important advantage that it requires no complicated mechanism for guiding, or a gripping arrangement for gripping and removing the cut waste sleeve sections, but that the waste sleeve sections at both ends of the divided spindle automatically can fall off or simply are thrown off by a throw-off strip. The useful sleeve sections remain in the carrier sled and are thereafter pushed onto a further processing mechanism or onto a conveyor belt. While the waste cut sleeve sections are being thrown off, the other one of the two parallelly disposed sleeve-receiving troughs can be loaded with the following sleeve to be processed. In particular, one of the advantageous features of the machine of the invention is its substantially higher operational speeds and its therefore correspondingly higher outputs when compared with machines of the state of the art.

The transporting of the sleeves or tubes onto the drawoff spindle and of the cut sleeve sections from the drawoff spindle back onto the carrier sled is carried out solely by means of the two axially movable end members forming part of the transport arrangement. The two terminal end pressure members of the transport arrangement are separately movably mounted which is another advantageous feature. In view of the fact that these members need only to be adjusted in the axial direction, the driving and controlling mechanisms for these parts are very simple. The transport arrangement and the carrier sled can be constructed of machine parts of low weight so that movable mass remains small, which is again a feature promoting the high output capacity of the machine constructed in accordance with this invention.

BRIEF DESCRIPTION OF THE DRAWINGS

The appended drawing and the following detailed description of the machine, constructed in accordance with the invention, will make the subject matter of the invention more apparent and clear to those skilled in the art.

DETAILED DESCRIPTION

Figure 1:
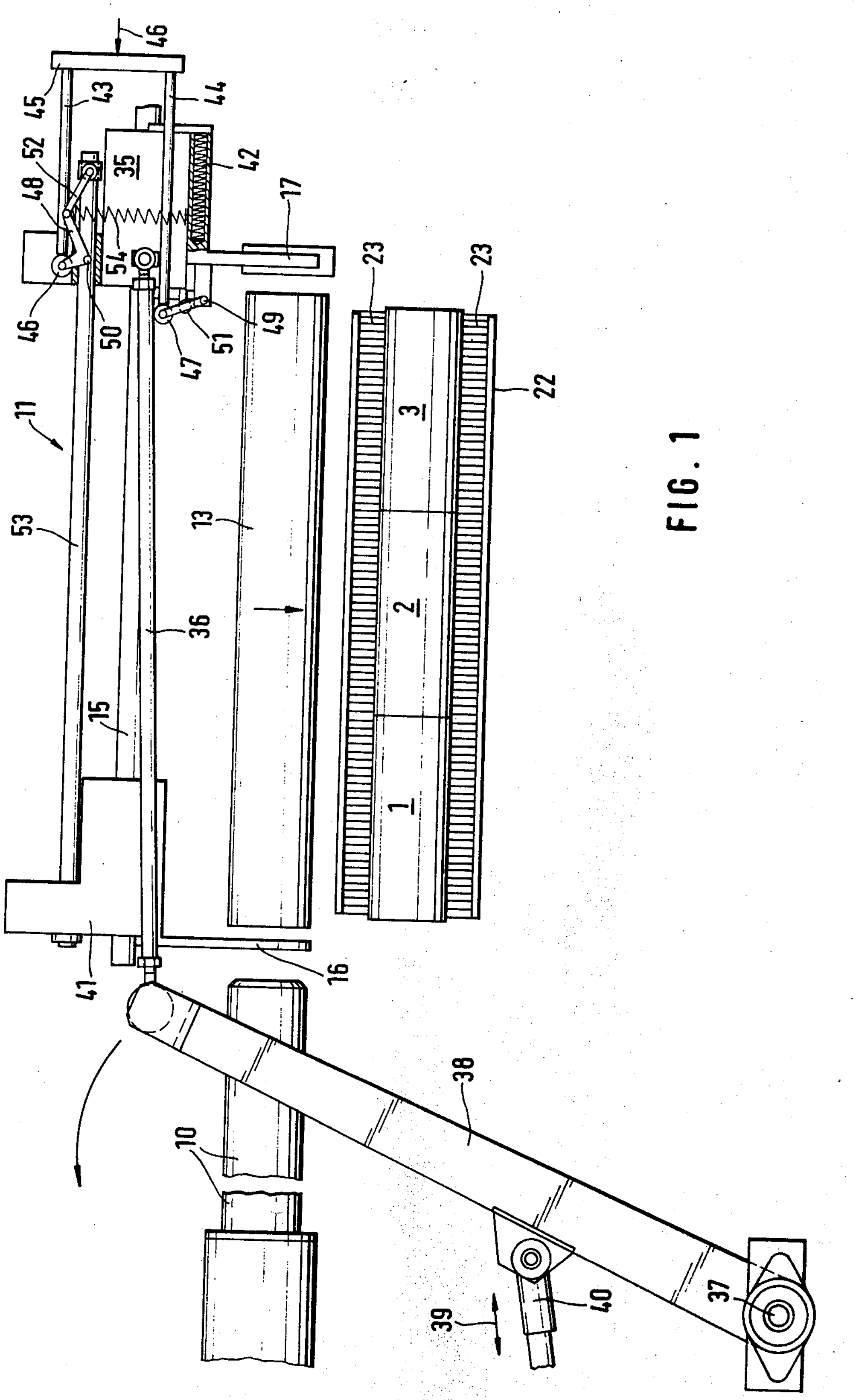
FIGS. 1–5 of the drawing depict schematically the draw-off spindle and transport mechanism of the machine, and in particular the disposition of the transport arrangement in five (5) different successive process steps which occur during a cutting of a sleeve section.

As above indicated, FIGS. 1–5, inclusive, depict successive process steps in the cutting of a sleeve section 13 by the apparatus of the invention. In FIG. 1 there is illustrated a draw-off spindle cam of the machine, which coacts with a holding and transport arrangement 11, and a receiving channel 22 which is provided with a bristle trough 23, in which there is disposed a sleeve partitioned into three sections 1, 2 and 3. A carrier sled 12, in which the transport and holding arrangement 11 and the sleeve receiving trough 21, into which the sleeve, which is to be cut or partitioned is to be inserted, as well as the sleeve 13, which is not partitioned and which is illustrated in FIG. 1 in the position in which it can be seized or grasped by the transport and holding arrangement 11.

Figure 8:
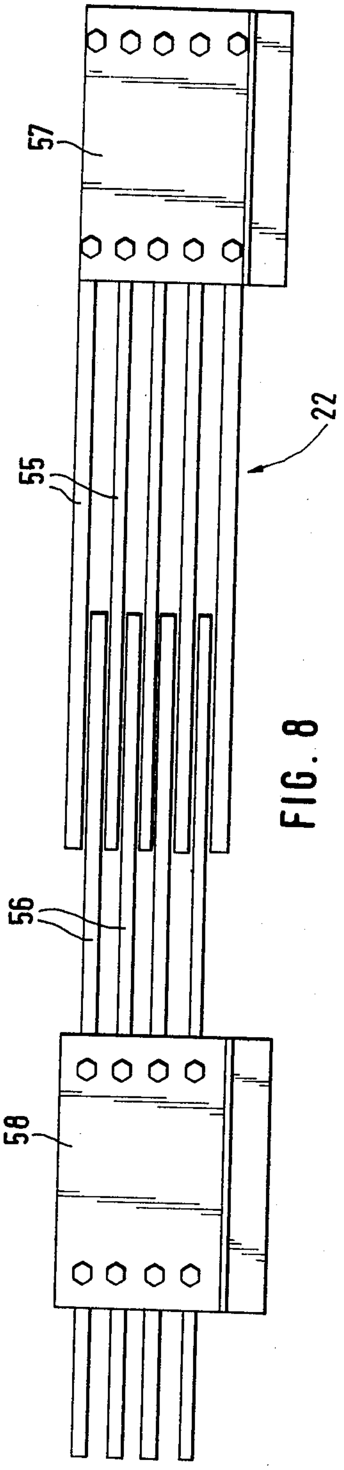
FIG. 8 is a plan view from above of the sleeve section receiving channel.

As shown in FIG. 8, the carrier sled 12 includes a body 18, which reciprocates in the direction of the double arrow 19 upon rigidly mounted stationary guide rods 20 between two limit positions transversely to the longitudinal axis of the draw-off spindle 10. The two sleeve receiving troughs 21 and 22, which are mounted on the carrier sled 12, lie parallel to each other and parallel to the axis of the draw-off spindle 10 of the machine. The distance between troughs 21 and 22 is equal to the length of travel of the carrier sled 12 in the direction of the double arrow 19. The lower sleeve receiving trough 22, which serves to receive the partitioned sleeve section 13', is provided with two confronting walls carrying bristles 23, which will hereinafter be described in greater detail in connection with the FIGS. 8 and 9. The slit in the partitioned or cut sleeve section 13' is contacted by the bristles 23, thereby preventing a tipping or tilting of narrow sleeve sections or sleeve section residues during introduction of the sleeve section by means of the transport arrangement 11 by sliding it into the carrier sled 12.

In FIG. 1 there is illustrated a transport arrangement 11, which includes a slidably movable mounting sled 35, movably parallel to the draw-off spindle 10, which is connected by means of a pivotally mounted rod 36 to a swing lever 38, the free end of which is pivoted about a stationary axis 37, the other end being connected pivotally to the rod 36. The swing lever 38 is moved by means of a drive rod 40 pivotally mounted to the swing lever 38, which reciprocates in the direction of the double arrow 39, thereby reciprocating the swing lever 38. The drive rod 40 may be the piston rod of a hydraulic or pneumatic cylinder/piston arrangement.

There is secured to the sled 35 a rod 15 which extends parallel to the draw-off spindle 10 and on which a slider 41 is movably mounted. A closing and pressing member 16 is secured to the slider 35. A second closing and pressing member 17 is mounted parallel to the rod 15 on sled 35 to move against the force of a return spring 42.

Figure 2:
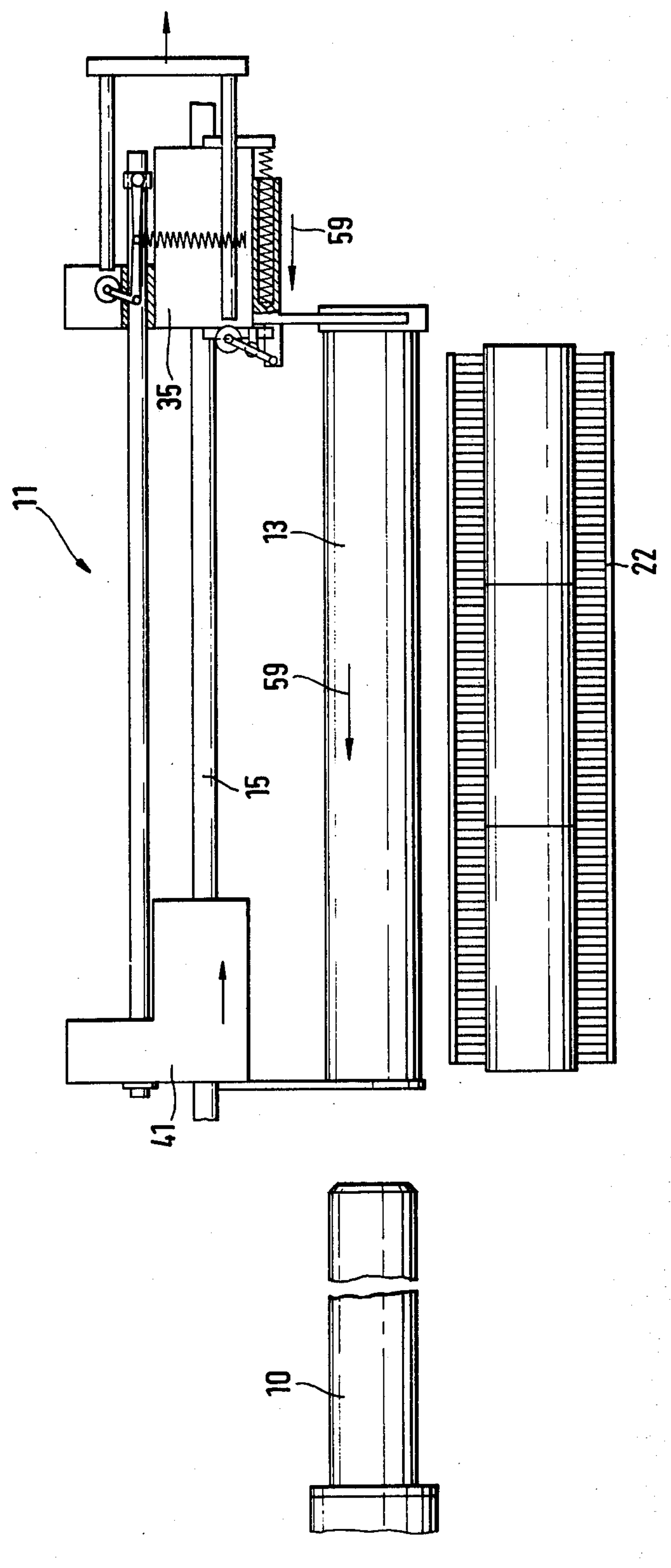

The sled 35, which is adjustable by means of the swing lever 38, is furthermore adjustably mounted by means of the rods 43 and 44 and the control part 45 in the direction of the longitudinal direction of the movement of the sled. The two rods 43 and 44 act on rollers 46 and 47, respectively, such rollers being mounted on the ends of double-armed levers 48 and 49, respectively, which are swingably mounted at the positions 50 and 51, respectively, on the sled 35. The double-armed lever 48 is connected at its free end with a link 52, which in turn is pivotally connected to a push rod 53, which at its outer end is fixedly secured to the slider 41. The lever 49 is coupled to the pressure part 17 mounted on the sled 35. When a pressure is exerted on the control part 45 in the direction of the illustrated arrow 46 by means of a contact, a rotating cam or other similar element, here not illustrated, such as a drive member—which does not concern the invention—then both rods 43 and 44 press onto the rollers 46 and 47, respectively, and cause a swinging of both levers 48 and 49. As a result of this, a coil tension spring 54, which is connected to the lever 48 is tensioned. Due to the swinging movement of both levers 48 and 49, the push rod 53 is moved by means of sled 41, which supports the pressure-closing member 16, towards the left and the other pressure-closing member 17 is moved against the force of the return spring 42 towards the right in FIG. 1. That is, the sleeve section 13 is seized by the pressure members 16,17 and is taken out of the receiving trough 21 (not illustrated in FIG. 1 for sake of clarity). During the return movement of the control part 45 towards the right in FIG. 1 the levers 48 and 49 swing back and cause the closure-pressure members 16 and 17 to engage the ends of the sleeve section 13, as is illustrated in FIG. 2.

Figure 6:
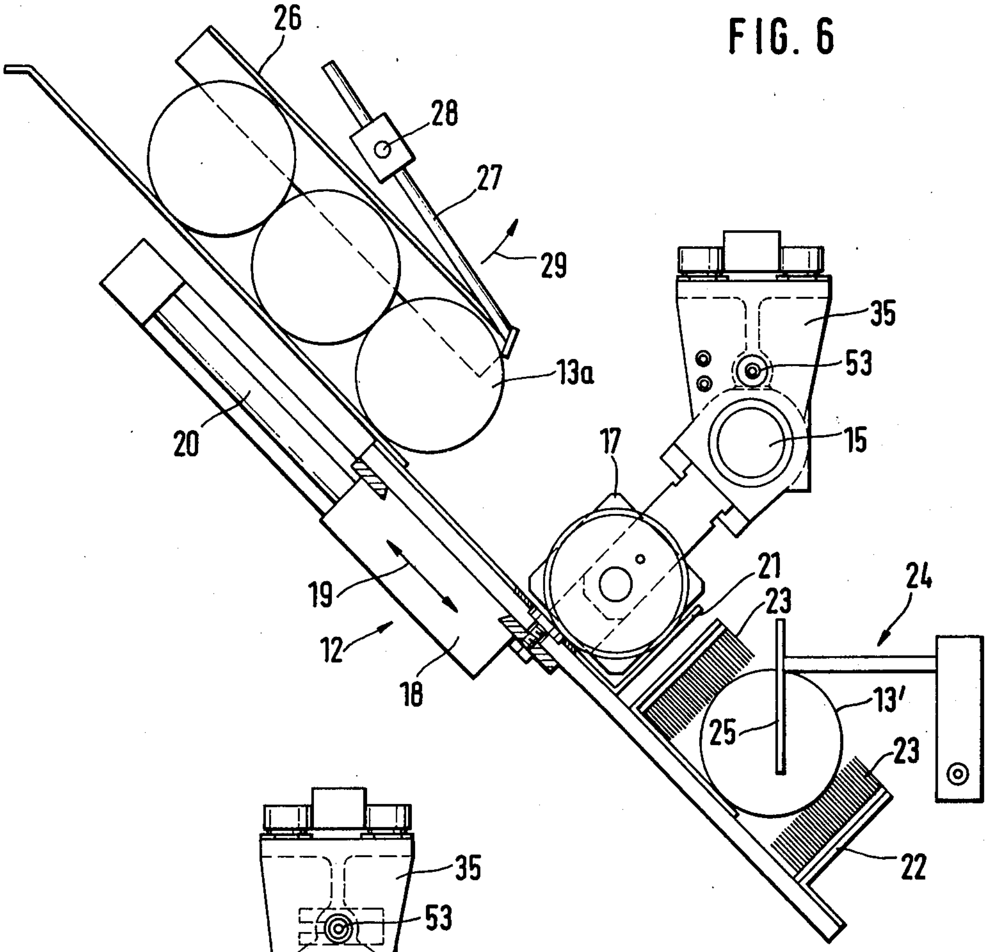
FIG. 6 is a side elevational view of the carrier sled for receiving the undivided, uncut, and cut sleeve sections with one of the two pressing members taken off.
Figure 7:
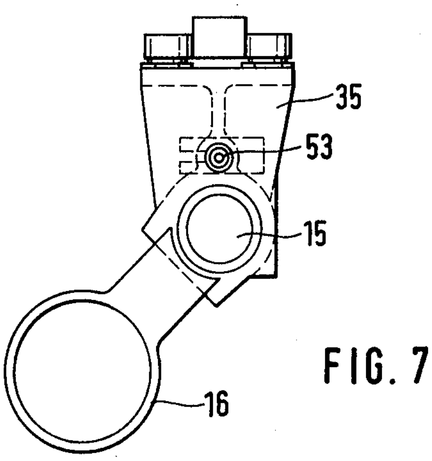
FIG. 7 is a portion of the side elevational view in which one of the two pressing members is shown.

FIG. 6 illustrates the nearly square form of the closure-pressure member 17. FIG. 17 illustrates the closure-pressure member 16, which is formed as a ring body, the interior diameter of which is maintained of such size that the pressure-closure member 16 can be slid over the draw-off spindle 10.

In FIG. 6 there is illustrated the carrier sled 12 and a lower portion of the apparatus in which the sleeve receiving trough 22 is in the operative range of a stripping-off member 24, member 24 being only schematically illustrated. This stripping-off arrangement includes two strip fingers 25 of which only one is illustrated in FIG. 6. These stripping-off fingers can be moved past the ends of the sleeve receiving trough 22 and thereby strip off waste or residue portions 31, 32 of the cut sleeve which extend beyond the sleeve receiving trough 22, such waste or residue portions can be prevented from falling freely by means of a breast bar. In the illustrated lower position of the carrier sled 12, the upper sleeve receiving trough 21 is located at the height of the draw-off spindle 10, as can be noted in FIG. 1. In the not illustrated upper position of the carrier sled 12, the upper sleeve receiving section 21 reaches up into the region of the next sleeve *13a*, as illustrated in FIG. 6, sleeve *13a* being positioned as the lowermost sleeve in the sleeve magazine 26 of the machine where it is held back by means of a locking arm 27 (FIG. 6). By means of swinging the locking arm 27 about its axis 28 in the direction of arrow 29, the lowermost sleeve *13a* is released from sleeve magazine 26 to fall into the sleeve-receiving trough 21 of the carrier sled 12.

Figure 9:
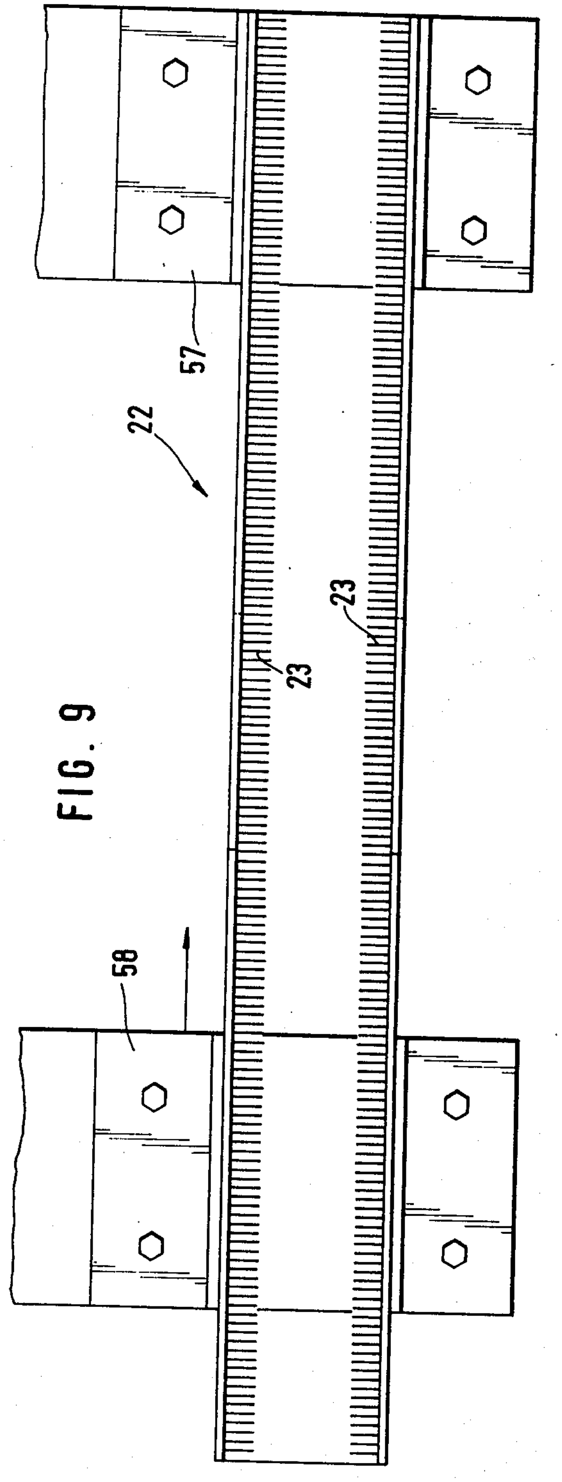
FIG. 9 is a side elevational view of the sleeve section receiving channel of FIG. 8.

FIGS. 8 and 9 illustrate the construction of the longitudinal adjustable sleeve section trough 22 in which the bristle-carrying members are mounted on opposite sides of the sleeve receiving trough 22 and are embodied in the form of parallel rods 55 and 56 extending in the longitudinal direction of the trough 23. The rod 55 is mounted in the first holder 57, and the rod 56 is mounted in the second holder 58. The free ends of the rods 55 and 56 extend into the gaps of the respective pairs of confronting rods and thereby overlap each other. By means of a relative adjustment of the holders 57 and 58, the length of the sleeve receiving section 22 can be adjusted to provide a greater or less overlapping of the ends of the rods 55 and 56 which are covered with bristles.

The above-described machine operates as follows:

After the sled 12 has transported the sleeve 13 from the sleeve magazine 26 in accordance with FIG. 1 to the height of the draw-off spindle 10, the two closing-pressure parts 16 and 17 of the transport arrangement 12, due to the opposite action of movement, move against the ends of the sleeve 13. Thereafter the sled 35 with the sleeve 13 is moved in the direction of the arrow 59 and the sleeve 13 is slid into the draw-off spindle 10. In FIGS. 2 to 5, incl., the swing lever 38 and the connecting troughs forming the drive members for the transport and holding arrangement 11 are not illustrated for sake of clarity.

Figure 3:
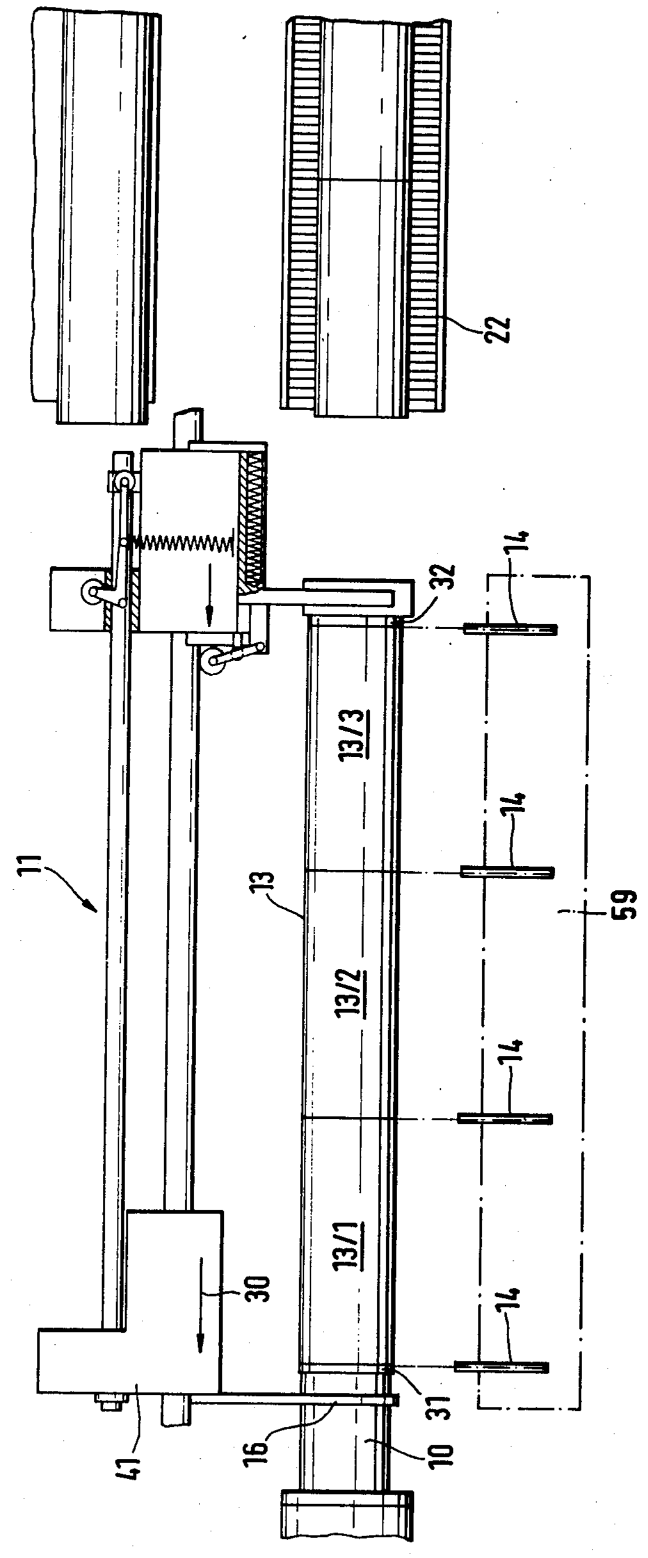
Figure 4:
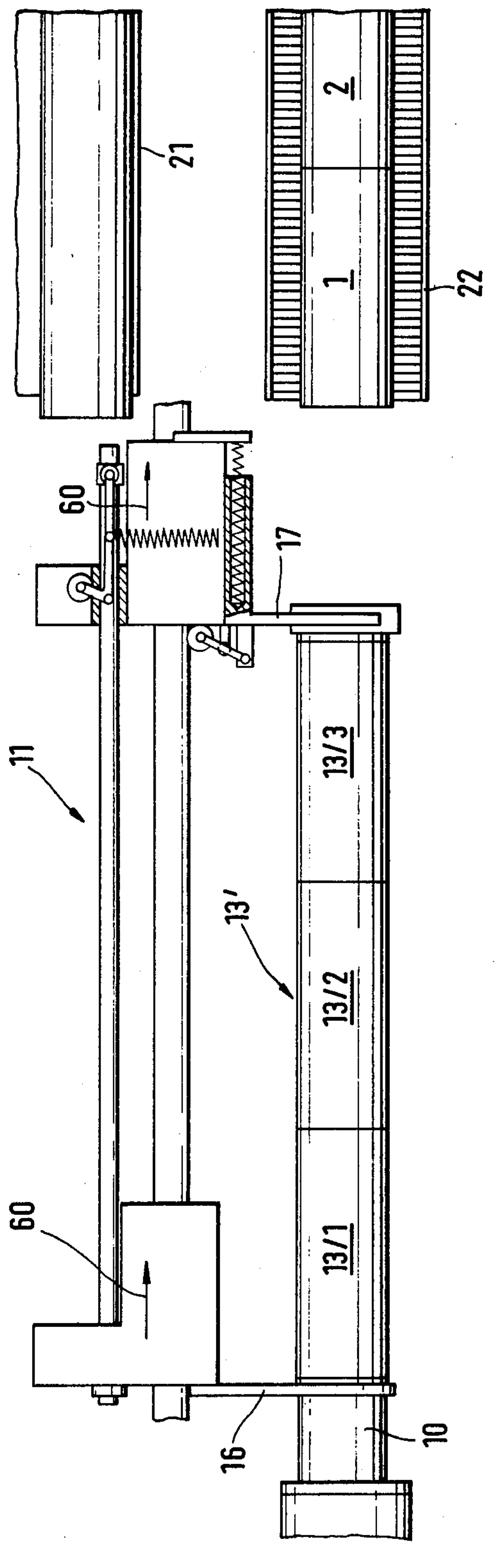

FIG. 3 illustrated the transport and holding arrangement 11 in the position after the sleeve 13 has been mounted on the draw-off spindle 10 which is rotatably mounted in a known manner. The cutting is carried out by means of disc knives 14, illustrated schematically in FIG. 3, which also in a known manner are mounted on a knife beam 59 on which they are freely rotatable, beam 59 being movably transversely with respect to the movement of the draw-off spindle 10. The knife beam 59 is illustrated only schematically in FIG. 3, where its position is indicated by a dotted line.

After the sleeve 13 has been slid onto the draw-off spindle 10, the slider 41 is moved in the direction indicated in FIG. 3 by the arrow 30 where the control part 45 and thereby one end of the sleeve 13 is released from the pressure-closing member 16. Thereby it is insured that with the following action of the rotary knives 14 for forming three equally long sleeve section 13/1, 13/2 and 13/3, a slidable displacement due to the thickness of the knive by the sleeve sections on the draw-off spindle 10 is possible. Otherwise grooves or bulges on the sleeve sections 13/1–13/3 at their edges might result. When sectioning the sleeve there may result small waste products 31 and 32 at both ends of the sleeve.

After the sectioning process has been terminated, the now cut section 13' mounted on the draw-off spindle 10 are again seized between the two pressure-closing members 16 and 17 of the transport and holding arrangement 11. Thereby the three cut sections 13/1 to 13/3 together with the residues and waste product pieces 31 and 32 are transported back into the carrier sled 12. Before this return movement of the transport and holding arrangement 11 in the direction of both arrows in FIG. 4, the carrier sled 12 is moved into a position upwardly from that shown in FIG. 6 so that the bristle-armed sleeve receiving trough 22 is aligned to the draw-off spindle 10. There are still present the sleeve portions 1, 2, etc. in the sleeve receiving trough 22 which were cut in a preceding working cycle. By sliding off the newly partitioned sleeve 13' from the draw-off spindle 10 by means of the transport and holding arrangement 11 and by the sliding in of the sleeve receiving trough 22, the sleeve parts 1, 2, etc. are slid from the sleeve receiving section 22 onto a transport conveyor belt 33, which is shown in FIG. 5.

Figure 5:
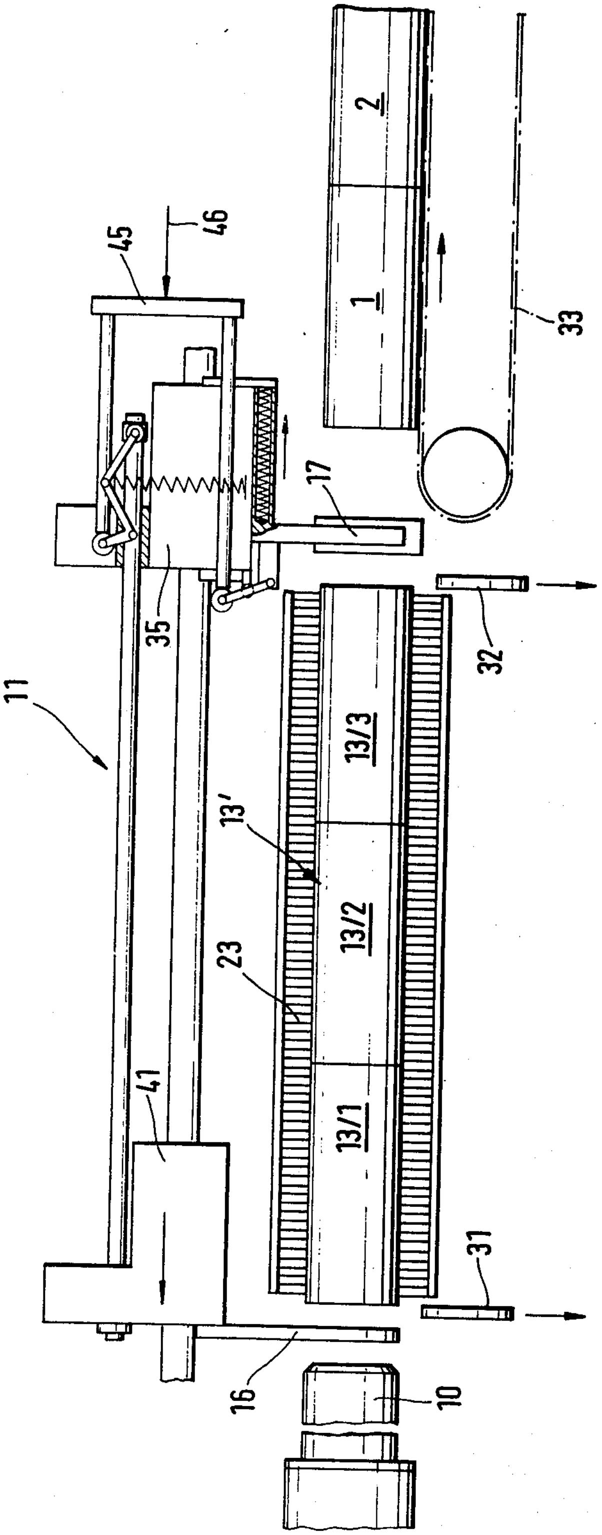

As can be noted from FIGS. 1 and 5, the length of the sleeve receiving section 22 is so adjusted that it is slightly shorter than the sum of the length of the three sleeve sections 13/1 to 13/3. Furthermore, the transport arrangement 11 is so adjusted that it brings the sleeves 13 and 13' into a relative predetermined position with respect to the carrier sled 12. If now, in accordance with FIG. 5, after the sliding in of the partitioned sleeve 13' into the bristle-armed sleeve receiving trough 22, the two pressure-closing members 16 and 17 are moved away from the partitioned sleeve 13' due to the actuation of the control part 45 in the direction of the arrow 46, then the edgeways pieces 31 and 32 of the partitioned sleeve 13', which are positioned outside the edge of the sleeve receiving trough 22, fall down under the influence of gravity. Should they, because of one or more dull disc knives 14, for example, be not cleanly or completely cut, then they are stripped off by the aid of the stripping fingers 25, illustrated in FIG. 6 from the adjoining sleeve section pass 13/1 or 13/3.

Although the invention has been illustrated and described with reference to a single preferred embodiment thereof, it is to be expressly understood that it is in no way limited by the disclosure of such a preferred embodiment, but is capable of numerous modifications within the scope of the appended claims.

What is claimed is:

1. A machine for automatically cutting and dividing cylindrical sleeves, comprising in combination, a spindle operatively mounted in said machine;

a knife support beam having a plurality of rotary knives transversely movably mounted in said machine relative to said spindle;

a transport arrangement operatively mounted in said machine and adapted to transport uncut sleeve onto said spindle so that they may be cut and divided by said rotary knives and then transporting the cut sleeves from said spindle, said transport arrangement including a pair of oppositely movable end pressure members adapted to grip said cut and uncut sleeves therebetween;

a carrier sled transversely movably mounted in said machine relative to the axis of said spindle and having a pair of adjustable parallel sleeve receiving troughs adapted to be reciprocably moved between precisely defined relative positions with respect to the carrier and the rotary knife supporting beam for delivering uncut sleeves to said transport arrangement and receiving cut sleeves therefrom.

2. The machine for automatically cutting and dividing cylindrical sleeves as set forth in claim 1, wherein at least one of said sleeve receiving troughs has a length which is equal or slightly smaller than the sum of the axial lengths of the cut sleeves into which the uncut sleeve is divided and said one sleeve receiving trough having a pair of bristle means mounted therein which extend longitudinally along opposite sides thereof and being adapted to receive said cut sleeve.

3. The machine for automatically cutting and dividing cylindrical sleeves as set forth in claim 1, wherein said end pressure members are independently adjustably movably mounted.

4. The machine for automatically cutting and dividing cylindrical sleeves as set forth in claim 2, including throw-off means transversely movably mounted in said machine relative to said one sleeve receiving trough, said throw-off means having a pair of stripping fingers and being adapted to strip off the waste cut end sleeve sections of the cut sleeve.

5. The machine for automatically cutting and dividing cylindrical sleeves as set forth in claim 4, wherein said carrier sled is movable between a sleeve receiving position and a position in alignment with said spindle, the distance between said two positions being equal to the distance between said pair of sleeve receiving troughs.

6. The machine for automatically cutting and dividing cylindrical sleeves as set forth in claim 5, wherein at least said one sleeve receiving trough which is adapted to receive the cut sleeve is longitudinally adjustable.

* * * * *